(12) United States Patent
Heinzel et al.

(10) Patent No.: US 7,827,204 B2
(45) Date of Patent: Nov. 2, 2010

(54) ORDER DOCUMENT DATA MANAGEMENT

(75) Inventors: Thomas Heinzel, San Francisco, CA (US); Thomas Mayer, Lelmen (DE)

(73) Assignee: SAP AG, Walldorf (DE)

( * ) Notice: Subject to any disclaimer, the term of this patent is extended or adjusted under 35 U.S.C. 154(b) by 1424 days.

(21) Appl. No.: 10/742,793

(22) Filed: Dec. 23, 2003

(65) Prior Publication Data

US 2004/0225636 A1    Nov. 11, 2004

Related U.S. Application Data

(60) Provisional application No. 60/458,425, filed on Mar. 31, 2003.

(51) Int. Cl.
*G06F 7/00* (2006.01)
(52) U.S. Cl. ............................ 707/802; 707/803
(58) Field of Classification Search .......... 707/1, 707/102; 705/9
See application file for complete search history.

(56) References Cited

U.S. PATENT DOCUMENTS

| | | | |
|---|---|---|---|
| 5,201,046 A | 4/1993 | Goldberg et al. | |
| 5,761,432 A * | 6/1998 | Bergholm et al. | 709/226 |
| 6,449,619 B1 * | 9/2002 | Colliat et al. | 707/102 |
| 6,898,593 B1 * | 5/2005 | Mulukutla et al. | 707/3 |
| 7,263,495 B2 * | 8/2007 | Rodriguez | 705/8 |
| 2001/0034627 A1 * | 10/2001 | Curtis et al. | 705/7 |
| 2002/0010615 A1 * | 1/2002 | Jacobs | 705/9 |
| 2002/0069096 A1 * | 6/2002 | Lindoerfer et al. | 705/7 |
| 2002/0077932 A1 * | 6/2002 | Mukai | 705/26 |
| 2002/0111842 A1 * | 8/2002 | Miles | 705/8 |
| 2002/0188530 A1 * | 12/2002 | Wojcik et al. | 705/28 |
| 2003/0018502 A1 * | 1/2003 | Rodriguez | 705/7 |
| 2003/0171962 A1 * | 9/2003 | Hirth et al. | 705/7 |
| 2004/0015408 A1 * | 1/2004 | Rauen et al. | 705/26 |
| 2005/0209914 A1 * | 9/2005 | Nguyen et al. | 705/14 |

FOREIGN PATENT DOCUMENTS

EP    1 258 812 A1    11/2002
WO    WO 01/67309 A2    9/2001

OTHER PUBLICATIONS

Anonymous, "TPC Benchmark D Standard Specification Revision 2.1," Transaction Processing Performance Council, Retrieved from the Internet: http://www.tpc.org/tpcd/spec/tpcd_current.pdf [retrieved Jun. 9, 2006], Feb. 16, 1998, pp. 1-20.

(Continued)

*Primary Examiner*—Etienne P LeRoux
*Assistant Examiner*—Cindy Nguyen
(74) *Attorney, Agent, or Firm*—Finnegan, Henderson, Farabow, Garrett & Dunner, LLP

(57) ABSTRACT

Methods and systems for managing order document data are provided. The order document data may be represented as an object, the object being configurable so as to comprise a predetermined number of core components, the core components being configurable in their content, and being hierarchically ordered in a corresponding number of levels. The object may comprise a number of extensions. The core components may comprise a header, at least one item, and/or schedule line. The header may comprise central information about an order.

17 Claims, 13 Drawing Sheets

OTHER PUBLICATIONS

Richard Hull, "Semantic Database Modeling: Survey, Applications, and Research Issues," ACM Computing Surveys, vol. 19, No. 3, Sep. 1987, pp. 201-260.

David DeWitt et al., "Parallel Database Systems: The Future of High Performance Database Systems," Communications of the Association for Computing Machinery, vol. 35, No. 6, Jun. 1, 1992, pp. 85-98.

Doron Rotem et al., "Physical Organization of Temporal Data," Proceedings of the International Conference on Data Engineering, Los Angeles, CA, Feb. 3-5, 1987, IEEE Computer Society Press, vol. Conf. 3, Feb. 1987, pp. 547-553.

Ilsoo Ahn et al., "Partitioned Storage for Temporal Databases," Information Systems, vol. 13, No. 4, Jan. 1988, pp. 369-391.

Thomas Zurek, "Optimal Interval Partitioning for Temporal Databases," Proceedings of the Third Basque International Workshop on Biarritz, France, Jul. 2-4, 1997, Los Alamitos, CA, IEEE Computer Society, Jul. 2, 1997, pp. 140-147.

Communication and Search Report of the European Patent Office, dated Jun. 28, 2006 (10 pages).

SAP NetWeaver™, pp. 1-8, © 2003.

SAP APO with SAP liveCache 7.4, pp. 1-4, © 2003.

U.S. Appl. No. 10/742,833, filed Dec. 23, 2003, entitled "Alert Notification Engine".

U.S. Appl. No. 10/742,832, filed Dec. 23, 2003, entitled "Time Series Data Management".

U.S. Appl. No. 10/742,794, filed Dec. 23, 2003, entitled "Alert Engine".

Anonymous, "Time Series: The Next Step for Telecommunications Data Management," Informix White Paper, 1999, pp. 1-27.

Ramez Elmasri et al., "Implementation Options for Time-Series Data," Temporal Databases: Research and Practice Springer-Verlag, Berlin, Germany, 1998, pp. 115-128.

Werner Dreyer et al., "An Object-Oriented Data Model for a Time Series Management System," Scientific and Statistical Database Management, Proceedings, Seventh International Working Conference, Charlottesville, VA, Sep. 28-30, 1994, pp. 186-195.

Jong Soo Kim et al., "On Effective Data Clustering in Bitemporal Databases," Proceedings, Fourth International Workshop, Daytona Beach, FL, May 10-11, 1997, pp. 54-61.

EPO Communication, mailed Feb. 10, 2006 (4 pages).

U.S. Appl. No. 10/742,833, filed Dec. 23, 2003, Alert Notification Engine.

U.S. Appl. No. 10/742,832, filed Dec. 23, 2003, Time Series Data Management.

U.S. Appl. No. 10/742,794, filed Dec. 23, 2003, Alert Engine.

* cited by examiner

ORDER DOCUMENT DATA MANAGEMENT

DETAILED DESCRIPTION

This application claims priority under 35 U.S.C. §119 based on U.S. Provisional Application No. 60/458,425, filed on Mar. 31, 2003, the complete disclosure of which is incorporated herein by reference.

FIELD OF THE INVENTION

This application relates to order document data management and, more particularly, to methods and systems for managing order document data.

BACKGROUND INFORMATION

In logistics, many different kinds of orders must be stored, processed, and transmitted from and to many different locations.

Current techniques model orders as hard-configured data objects. Such objects cannot easily be adapted to particular types of orders. For each other type of order, an individual object must be programmed in form of program code.

Further in business applications, the data representing such orders has been stored independently of any content in databases. Therefore, accessing the data may be lengthy when the data is stored on an order which is not adapted to the kind of data.

SUMMARY OF THE INVENTION

It is an object of the present invention to provide a general data storage model for all types of orders, in particular for logistic orders. It would be desirable to have configurable order types.

This and other objects are achieved by the order document data management (ODM) according to the present invention.

ODM is a highly configurable module to manage the database storage of order document data. Multiple order data areas can be used to limit the amount of data to be stored in one database table.

In one embodiment, the present invention provides a method of managing order document data, the order document data being represented as an object, the object being configurable so as to comprise a predetermined number of core components, the core components being configurable in their content, and being hierarchically ordered in a corresponding number of levels.

One of the advantages is that all kinds of orders are represented by objects which have a generally common structure. Since the objects which represent orders are configurable in their content, but always hierarchically ordered, the processing thereof can be made by standardized operations. These common operations can be optimised once for all, leading to faster processing operations.

In a further aspect, the invention provides that the object comprises additionally a number of extensions.

By provision of such extensions, the order objects can be adapted to model orders for particular needs.

Particular embodiments of the invention may comprise one or several of the following features:

The core components may comprise comprising header, optionally at least one item, and/or schedule line. The header may comprise central information about an order.

The number of levels may be 2, on the $1^{st}$ level being the header comprising business partner information, on the $2^{nd}$ level being the item comprising product information, order quantities, and a time stamp information.

The number of levels may be 3, on the $1^{st}$ level being the header comprising business partner information, on the $2^{nd}$ level being the item comprising product information, on the $3^{rd}$ level being schedule line comprising order quantities, and time stamp information.

An extension may be assigned to a core component, and comprising additional information relating to the component.

The information comprised in an extension may be organized in several parts, each part being linked with the corresponding core component.

The invention further comprises a method of generating database objects and the associated program code for performing the methods to manage the order documents.

The configuration may be performed in a modular way on the basis of core components and extensions.

In a further aspect, the invention comprises a method of managing a database for a business application, the data being organized into business objects, wherein the data is split into groups according to a configurable set of conditions, the conditions being based on semantic properties of the business objects, and each of the groups of data is stored in a set of tables of the database which is associated with a condition of the set of conditions.

Each order data area may specify a set of tables to be used for storage of order documents of a particular order data type. By design, the scope of an order data area may always limited by the corresponding order data type.

Multiple order data areas can be used to partition large amounts of data into several sets of tables in order to enhance performance. The distribution of data across data areas may be done according to configurable conditions on the order content, so that orders that are usually accessed together are stored in the same set of tables. The introduction of order data areas may help limit the number of entries in individual order tables. The partitioning can simply be done according to order document type and version, but more complex partitioning schemes, e.g., according to partners, products or locations can be used to further limit the amount of data for each table. This can be used to increase performance for very high volume scenarios.

As an example, it is possible to store the active version in one set of tables and all other versions together in another set. Alternatively each version and data for each location could be stored in its own set of tables.

Since the functionality of order data areas may be hidden within ODM, they can be introduced to improve performance without influencing the applications that are using ODM.

This inventive embodiment may comprise one or several of the following features.

The set of conditions may be based on the way how the business objects are accessed by a business application; for ex example order documents organized according to versions for supply chain planning purposes.

The set of conditions may be organized into a decision tree.

The method may be performed in a hidden manner to the business application.

The invention further comprises a computer system for performing the method as described above.

The invention also comprises a computer-readable storage medium comprising program code for performing the methods as described above, when loaded into a computer system.

BRIEF DESCRIPTION OF THE DRAWINGS

Figure 3:
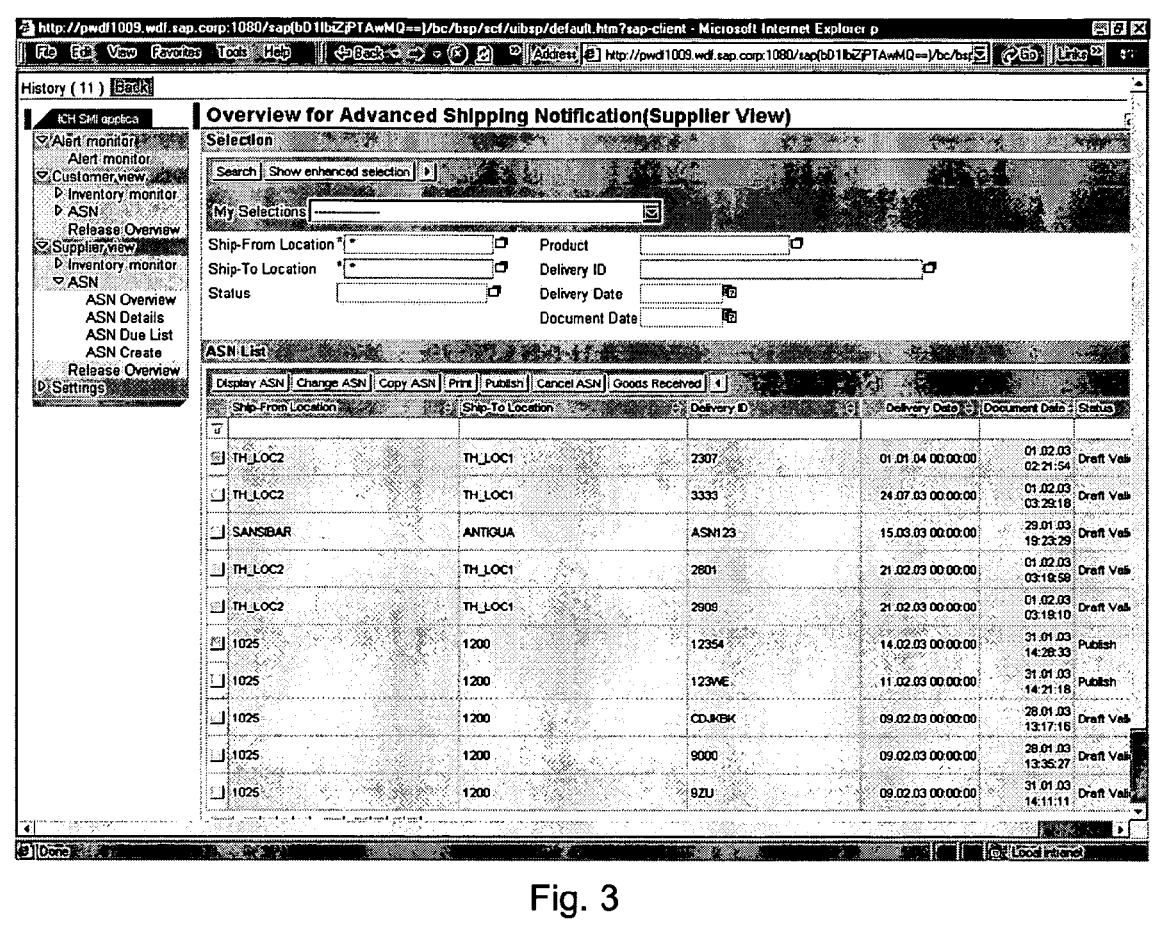
Figure 4:
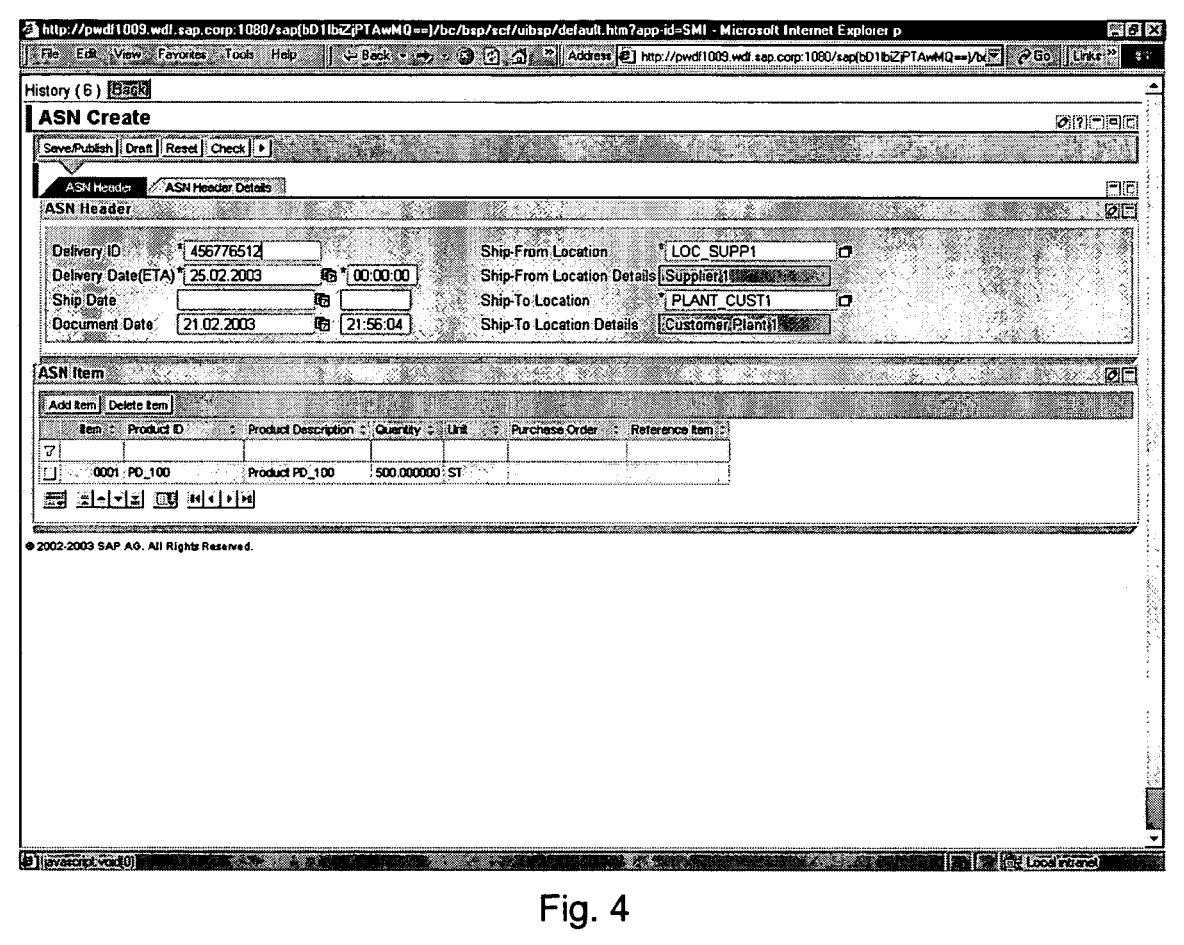
Figure 5:
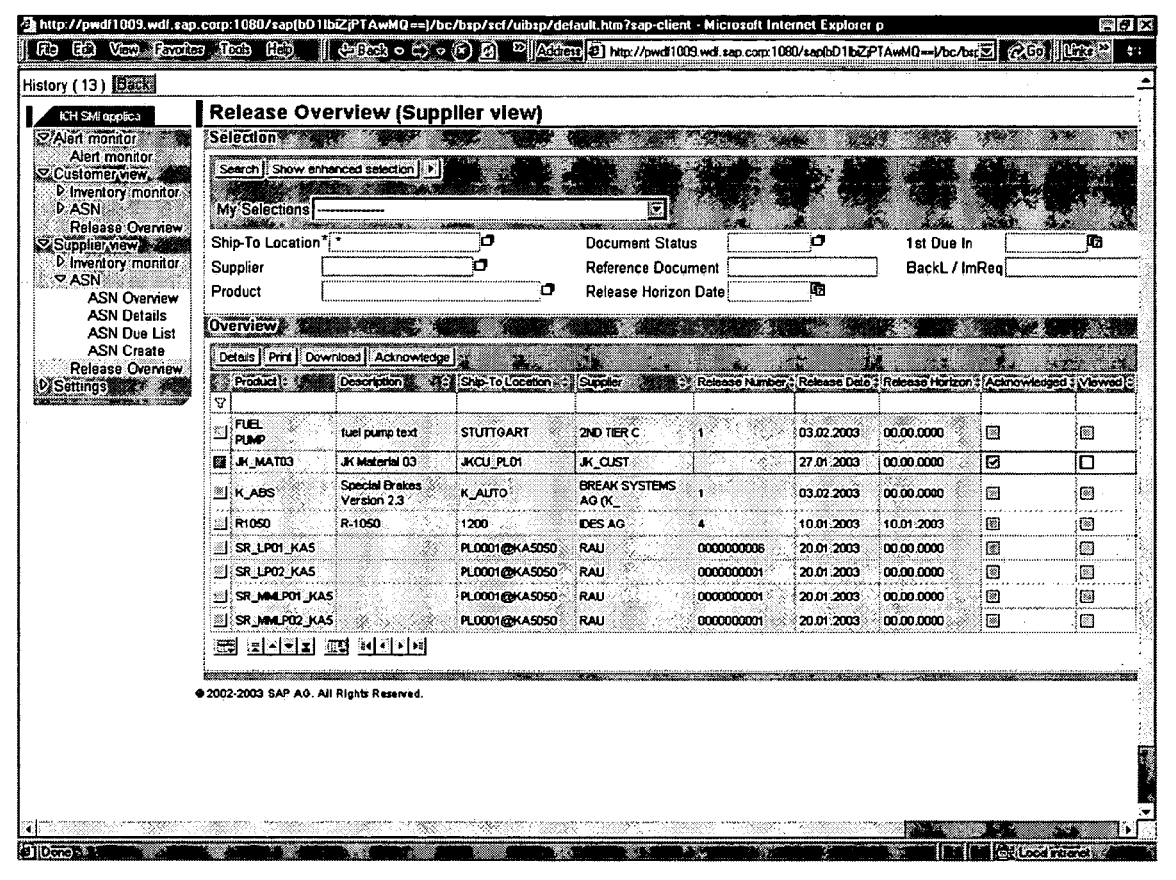

FIGS. 3-6 illustrate, by way of example, screen shots of software systems which implement the inventive method;

DESCRIPTION OF THE EMBODIMENTS

Order documents that are managed by the inventive ODM may preferably be logistic order documents, i.e., order documents that describe the movement of products or associated services. However, the concept of an order document in ODM is very general.

In the context of ODM, an order document may be any hierarchical object that may be made up of a one-level, two-level or three-level core with 1:n relationships among the core components and extensions. IDs or numbers may function as keys of the core hierarchy. Within ODM, both core and extension components can be freely defined to contain arbitrary sets of fields.

Order documents can be selected according to flexible criteria that can involve fields of any of the core components and extensions.

Figure 1:
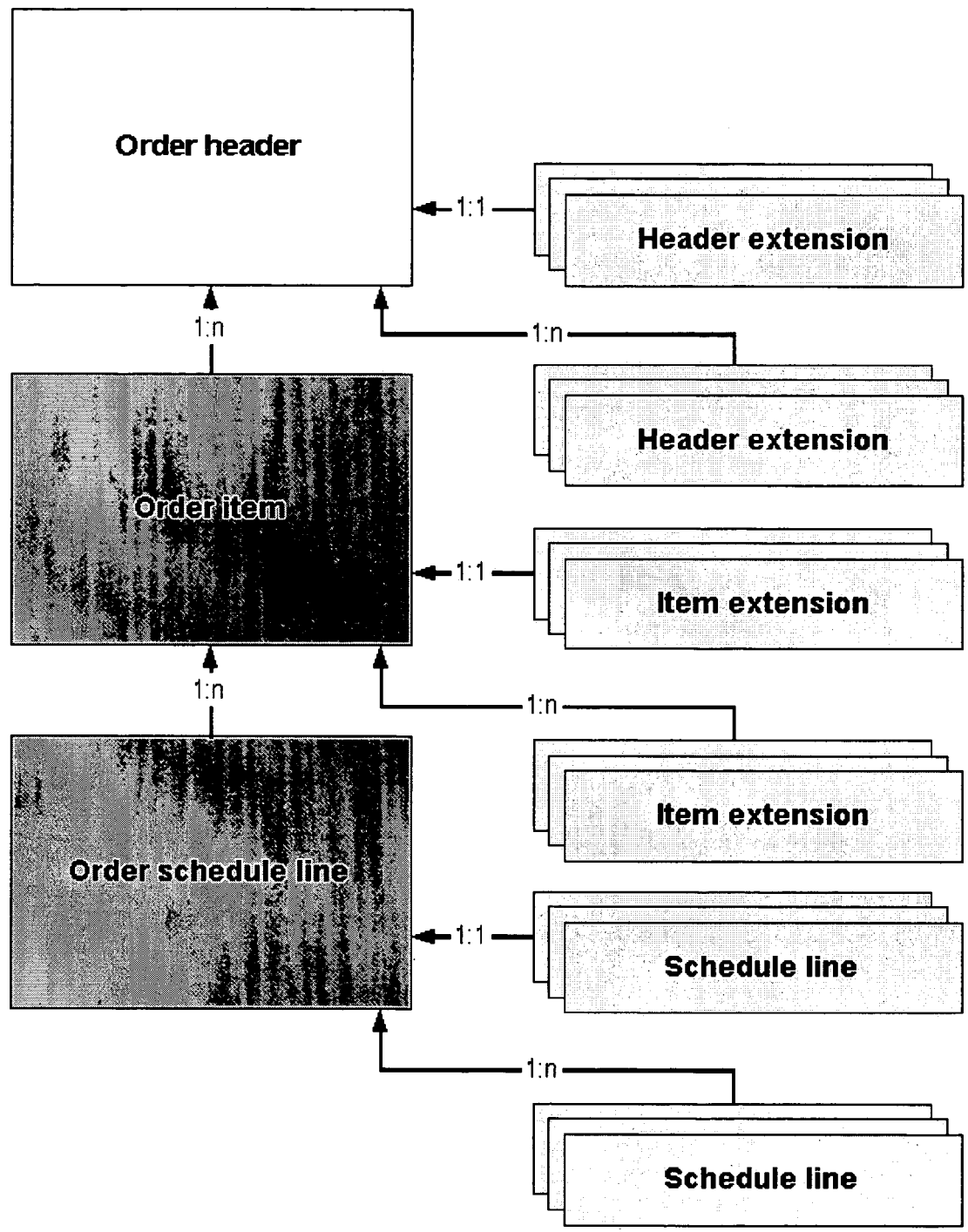
FIG. 1 illustrates the order document hierarchy according to a first embodiment of the present invention.

In this way, ODM may be a generic data management module for hierarchical objects. FIG. 1 illustrates an exemplary hierarchy of the objects which model order documents. As can be seen from FIG. 1, on the top is the order header component, optionally followed by an order item component and optionally by an order schedule line component. Each of the components may have extension components.

The central constituents of an order document may be denoted core components. They may model order header, items or schedule lines. The ODM may support different structural types of order documents with different hierarchy levels.

The core of single-level order data types may be built out of a header only. The core of two-level order data types may be built out of header and item component. For logistic order documents, items may usually describe quantities and time stamps. The core of three-level order data types may be built out of header, item and schedule line component. For logistic orders, items usually may describe product(s) and location(s) and schedule lines quantities and the time stamps. It is to be noted that the present invention is not limited to three levels. The core hierarchy can be extended to further hierarchy levels.

Optional parts of an order document may be denoted extensions. They may be in addition to and related to the core components. An extension may be a grouping of several attributes (fields) relevant for a theme into one component. The definition of the theme may usually be relatively broad to limit the number of extensions and hence the number of tables needed to store a corresponding order document (in order to improve the performance). On the other hand, data that is often not required when reading an order document should be stored in separate extensions to minimize the amount of data that needs to be accessed.

An extension may be assigned to one of the core components (header, item, schedule line) in a 1:1 or 1:n relationship. Each entry in an extension table may be assigned to exactly one core component entity (header, item, schedule line). For a 1:n relationship between core component and extension, the extension needs one or several additional key fields to separate the corresponding entries. Extensions themselves and the extensions that are supported for a given order data type can be configured. Technically, any extension can be assigned to any order data type.

The order document header may be, as described above, one of the core components of an order document. It may be situated on the top level. Each order document may only have one header that stores central information.

The order document item may also be one of the core components of an order document, as described above. It may be situated on the second level. Each order may have any number of order document items. Order document items may be related to order document headers in a 1:n relationship.

The order document schedule line may be one of the core components of a three level order document. Each order document may have any number of order document schedule lines. Order document schedule lines may be related to order document items in a 1:n relationship.

References may represent relationships between different order documents and can be stored in specific reference tables of the ODM. More specifically, references can store links between core components (header, item, schedule line) of the same or different order documents.

A reference can connect components of any level with any other level. There can be any number of references from one component to any other components. References build N:M relationships between components. Each pair of components can be linked in multiple ways that are distinguished by the reference type. ODM may allow selecting referenced and referencing orders. Within a supply chain management (SCM) context, this may for example be used by fulfilment coordination control objects that groups several schedule lines of sales orders or similar order documents together to coordinate their delivery process.

Mapping may denote the function to associate external readable numbers for an order document header, item or schedule line with internally used IDs. Any order document can have several external numbers at any level. These numbers may need to be differentiated by a partner ID or logical system ID. This mapping may be independent of versions, i.e., version is not a key field of the corresponding tables.

Figure 2:
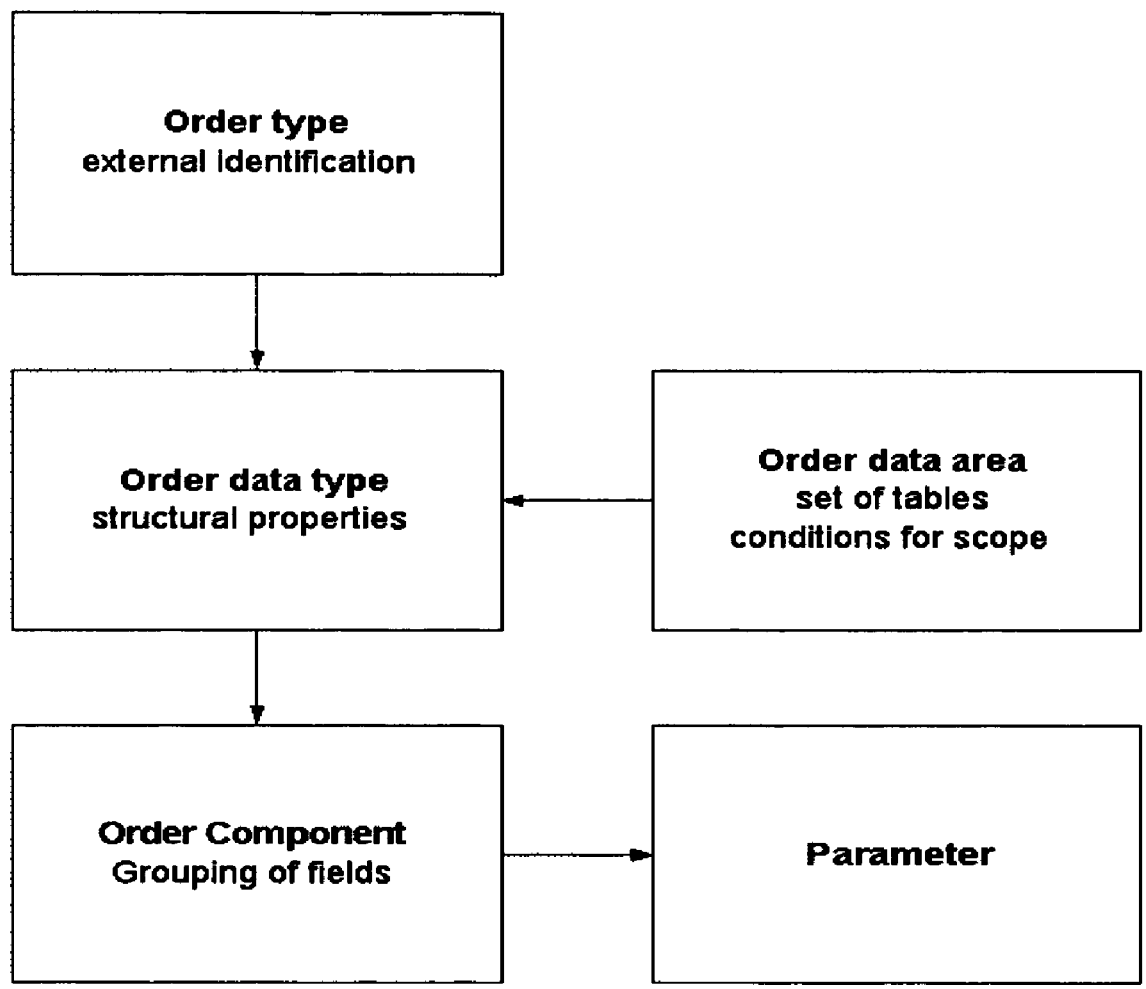
FIG. 2 illustrates an exemplary overview of meta data objects according to the present invention.
Figure 6:
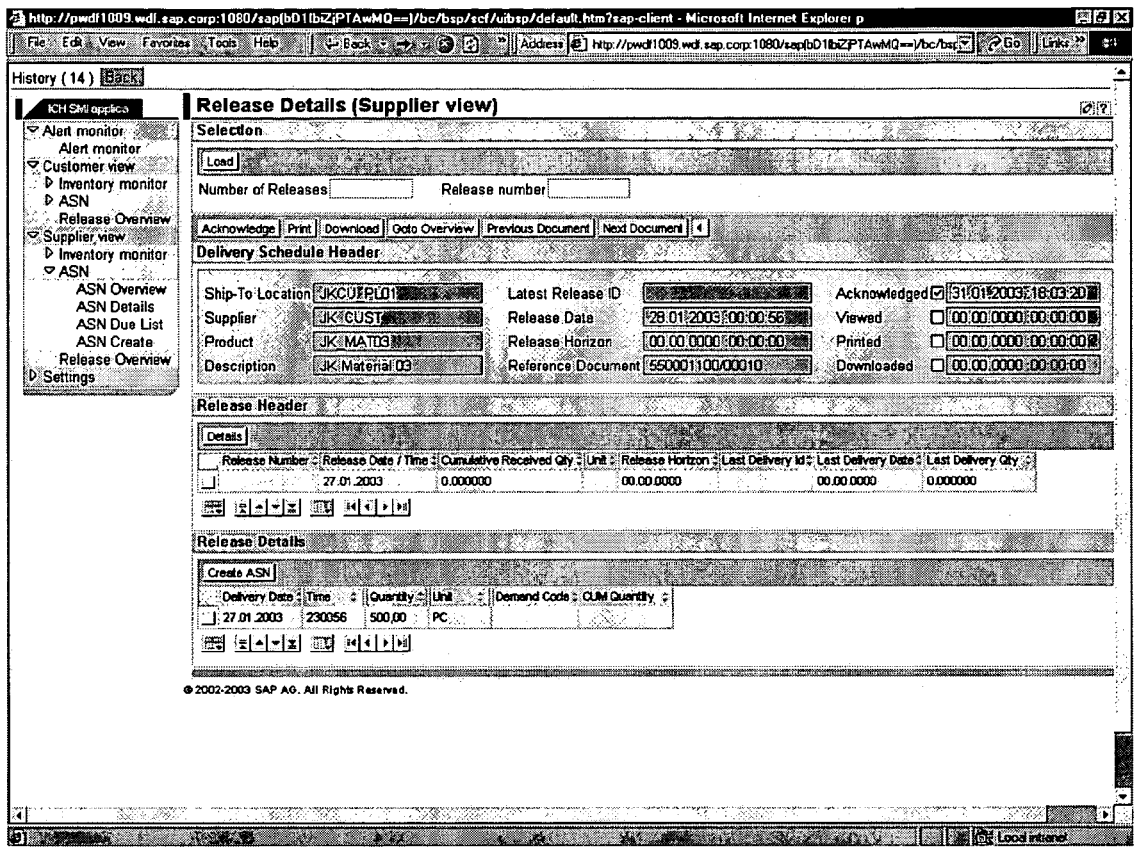

With reference to FIG. 2, exemplary data objects are described which may be used to configure the Order Data Management. The arrows between these meta-data objects may represent the relationship that the source uses the target in its definition.

Order documents may be used in different business contexts. The order document type may be the corresponding object that is used by applications to identify a class of order documents.

The order data type may describe the structural and technical properties of a set of order document types. The order data type may specify number of levels, core components and extensions.

Order data types can be used to define single-level, two-level and three-level order documents: For SCM applications, order documents may usually composed of header and items (two-level order type) or header, items and schedule lines (three-level order type) and describe partners, locations, products, quantities and times for the movement of physical objects. Order data types may be hidden from applications that use ODM. The order data type may describe the structure of the tables that are necessary to store corresponding order document data, but does not specify the database tables themselves.

For this purpose, the concept of order data areas is introduced: Each order data area may specify a set of tables to be used for storage of order documents of a particular order data type. By design, the scope of an order data area may always be limited by the corresponding order data type. Multiple order data areas can be used to partition large amounts of data into several sets of tables in order to enhance performance. The distribution of data across data areas may be done according to configurable conditions on the order content, so that orders that are usually accessed together are stored in the same set of tables. It is also possible to store several order document types with the same order data type in one set of tables, so that reading across these order document types might be simplified and performance improved.

For example, it is possible to store the active version in one set of tables and all other versions together in another set. Alternatively each version and data for each location could be stored in its own set of tables. Order data areas may be hidden from applications that use ODM.

Order components are objects that may describe the definition of the parts of an order document, i.e., core and extensions, in particular the corresponding structures, fields and keys. These structures may also be used in the interfaces of the ODM.

For each component one may define the levels of an order document it is associated with. One also may need to specify whether the component has a 1:1 or a 1:n relationship to the corresponding core component and in the latter case the corresponding key fields.

It should be noted that order components, order data types and order data areas may exist in an inactive version that describes their definition and in an active version that reflects the currently used state of the definition. Activation of these meta-data objects may generate corresponding code and data structures and copies the relevant table entries from the defining inactive version into the active version.

The ODM may have user interfaces for the following configuration tasks:
  maintain order type;
  maintain order data type;
  maintain order component;
  maintain order data area;
  activate order component;
  activate order data type; and
  activate order data area.

The introduction of order data areas may help to limit the number of entries in individual order tables. The partitioning can simply be done according to order document type and version, but more complex partitioning schemes, e.g., according to partners, products or locations can be used to further limit the amount of data for each table. This can be used to increase performance for very high volume scenarios.

Since the functionality of order data areas may be hidden within ODM, they can be introduced to improve performance without influencing the applications that are using ODM.

In one embodiment, which is the SCM application provided by SAP Aktiengesellschaft, Walldorf, Germany, the following order document types may be provided:
  delivery (two-level order);
  delivery schedule release (three-level order);
  stock transfer order for distribution planning (three-level order); and
  transport load building order (two-level order).

The following Figures illustrate exemplary screens shots of objects that may be stored in ODM. The screens themselves may not be part of ODM.

FIGS. 3 to 6 illustrate exemplary screen shots of a software application which uses the inventive ODM.

In the following, examples for data that are stored in order documents are given. These examples focus on logistic orders documents.

Partner and location data may usually be stored at header and/or item level as partner/location from and partner/location to. Where the different partner and locations are stored and how the different values are used, may be defined by the order data type.

For SCM applications, quantities may usually be stored within the order document item (for 2-level order data type) or within the order document schedule line (for 3-level order data type).

For SCM applications, the ODM may store time information as time stamps or time periods. A time stamp may be the combination of date and time. Every time stamp may be accompanied by a time zone. The time periods may be built out of two time stamps with a single time zone.

For SCM orders, usually two time periods may be stored in the core item table. The order data type may determine the meaning of these time stamps. Further time periods might be stored in time extensions. To identify the meaning of, an additional time period in an extension table an additional qualifier may be used.

In the following, the database tables used for storing the different kinds of orders are described in more detail.

The database tables, in which the order data may be stored, can be separated into two groups: For most order types the structure of the component tables for header, item and schedule line may be the same. This may constitute the core of the order. The fields of these core components may be restricted (they contain general fields, which are independent of order type and are used by all or the most order types). Depending on the level-type, there may exist two different types of the core component "order item". Additional data, which is only necessary for one or some order types, may be stored in extensions, e.g., if only one order type needs transportation information.

In one example, the ODM may support three different structural types of orders with one, two or three hierarchy levels. Which type of order structure will be used may depend on the order data type and may be specified by the so-called level-type.

The core of two-level order data type may be built out of header and item component. Here, the item component may contain the quantity and the time stamp. This order type can handle only one quantity with one time for each item. However, several aspects of the same physical object can be stored in this item (e.g., quantity and gross quantity). The number of possibilities may be given by the item component and its extensions and depends on the existing quantity columns.

The core of three-level order data type may be built out of header, item and schedule line component. The item component may contain product and location(s) and the schedule line component quantities and the time stamps.

For several representations of a single physical quantity or in the case of requested and confirmed quantities, several schedule lines for one item may be used. Within such a set of schedule lines, the schedule line type may distinguish individual schedule lines.

Fields that are not necessary for every order type or every application may be stored in extensions. An extension may be a special type of component, used in addition to the core components. Extensions may group several fields of one theme (e.g., transportation planning). The grouping of the field may be rough, to minimize the amount of additional tables, because the number of tables influences the performance of reading or writing an order. The extensions supported for a given order type may depend on the associated order data type. They can be set up in the configuration of the order data type (which is assigned to the order type). Technically any extension can be assigned to any order data type. While extensions database tables could be assigned to multiple core components of an order, every instance of an extension may be assigned to only one component. So, an extension entry related to a schedule line, could not be related to an item. A core component entity can have several entities of one extension (e.g., an item can have several partners, which are stored in one extension).

The extension may be built out of two parts. The first part may be the standard key, which may be used for every extension. The standard key may server as the ID of the order, the item and the schedule line and the version ID. The extension may be related to the lowest filled part of this key. The ID's from higher levels may only be used as a short cut to read the data. It may not be allowed to use these fields to connect the extension to different entities or levels.

The second part of the extension may be the 'pay load'. The fields of the extension may be collected in one structure.

The associated order data type may describe the structure of an order type. It may model the technical properties and structure of a set of order types, and it may specify number of levels. Further, it may specify which tables need to be generated for each related order data area, core component tables, or extension tables.

Order data types may be hidden from the application; only the order type may be relevant for data access. The order data type may describe the structure of the tables that are necessary to store corresponding order data, but may not specify the database tables themselves. For the latter purpose, the concept of an order data area may be introduced. It may specify a set of tables to be used for storage of time series of a particular order data type.

By design, the scope of an order data area may always be limited by the corresponding order data type, which describes the structure of the tables. Order data areas may be hidden from the application. Only the order type may be relevant for data access. The activation of an order data area may (re-)generate the corresponding set of tables.

Optionally, the validity of an order data area can be limited to specific order types and specific versions. Multiple order data areas can be used to partition large amounts of data into several sets of tables in order to enhance performance. The separation of the order data in different sets of tables by the version is optional.

It is also possible to store several order types with the same order data type in one set of tables, so that read access across these order types might be simplified and improved with regard to performance.

The structure of the different components may be common for all order types. So, the structure of the header table and in general of all core components may be the same for all order types. The same may be valid for extensions: e.g., the structure of the extension 'transport' may be the same for all order types that are using it.

To avoid inconsistencies the meaning of the content of components should be the same across all order types and applications, too. In that sense the components and in particular the extensions may have a semantic meaning while within the ODM itself this meaning may not be relevant.

Order data can be stored in several (planning) versions. For the ODM there may be no semantic properties associated with individual versions. Instead it may just be an additional key field for all order related tables. If a version of an order exists, the complete data of the order valid for a version may have to be stored for this version. In other words, there may be no mixture of order data of different versions within one order in the ODM.

Partner and location data can be stored at header and item level as partner/location from and partner/location to. Where the partner is stored and how the different values are used, may be defined by the order data type (depending on the level where they are stored). For each order data type one can decide whether the partner and location fields on item level are used. The read access via partners or locations may be executed accordingly. In more detail, there may be two different mechanisms supported, Header Logic, and Defaulting-logic.

Header logic: the partner set at header level may be valid for all items of the order. The ODM may not prohibit that the partners/locations can be set at the item level. But for all read access may be performed by the ODM the item partner/location values are ignored.

Defaulting-logic: the partner set at header level may also be valid for the item level, if there is no partner defined there.

In addition to partner/location from and to, further partners and locations could occur in any number. These can be stored in special extensions that contain a "partner role" as key field.

To facilitate the reading of data from tables of order data areas that may be used by multiple order types, the order type may be a part of all order tables.

Order header and order item each may contain a single status field. The value of this status may be defined by the applications and may contain a general, accumulated status value. Using appropriate extension structures one could configure additional fields that can be used as status by an application. The ODM may not perform any checks on status values, but may allow selection only as for any other core or extension field. If more functionality associated with status fields should become necessary for an application, the central Basis status tool could be used.

ODM may not have its own order number assignment. If missing, Globally Unique Identifiers (GUIDs) as internal keys may be created by ODM, but no readable order, item or schedule line numbers may be created.

Mapping may denote the function to translate an external, readable number of an order, item or schedule line to the internal used GUIDs. The mapping may be independent of versions, i.e., version may not be a key field of the corresponding tables.

The mapping may be stored on the lowest level of the order structure, i.e., there may be a mapping of combinations of order and item number or order, item and schedule line number to the corresponding GUIDs for two-level and three-level orders respectively. These data can be used to map at any level (header, item, schedule line) of the order.

Any order can have several external numbers at any level. These numbers may need to be differentiated by a partner ID or logical system ID.

Confirmation may denote here the answer specifying products, quantities, times and other details to a request described by an order. In principal, several possibilities exist to store confirmations:

Two different order types may be used for request and confirmation. The request may be stored in one order and the confirmation may be stored in another order with another order type and hence in different tables.

Here, the request and the confirmation may be explicitly separated. If for different tasks (or applications) only one type of quantity is used and the other type is ignored, no additional condition than the order type may have to be checked to get only one type of quantity. An example would be to read quantities of one type only, e.g., to create a time series.

It may be more complicated to connect or to combine the request with the confirmations than in the second possibility outlined below, because references span different tables. This connection may, for example, be necessary to identify the open quantity (the difference between the confirmation and the request). The information may be important for fulfilment coordination to trigger functions to plan additional supply.

The request and the confirmation may be stored in the same order (only one order type is used).

Request and confirmations may always be stored in the same table. The different types of the quantities may need to be identified with a qualifier on the schedule line level.

For a new type of quantity only the qualifier of the schedule line may need to be expanded.

The requested and open quantities can be read and may always read in one step.

The reference between confirmation and request may be stored in the same table as the schedule lines themselves. The confirmation may be linked with a reference field to the request.

A confirmation schedule line may be connected with a request schedule line by a reference in the schedule line itself. This reference may be restricted to the given order. This means that a schedule line may reference any other schedule line of the same order independent of the item but not across orders, at least not by this mechanism.

Request and confirmation could also be stored in different tables at the same order type. The quantities may clearly be separated. It may be easier to create a time series with quantities of one type only. For a new type of quantity a new table may need to be created. Request and confirmation may be stored in the same table, but the two types of quantities may be stored in different columns. This mechanism may not be suited for references between orders and items other than 1:1.

A time stamp may be the combination of date and time. UTC may not necessarily be true. In ODM, a field to store a corresponding time zone may always accompany a time stamp. The time zone may be stored together with the time stamp to allow the UI display of the correct time, even if the corresponding location is not restorable.

Two time stamps may be stored in the core item table. The order data type may determine the meaning of these time stamps. Further time stamps can be stored in the time extension. To identify the time stamp in the extension table an additional qualifier may be used.

References representing a hierarchy between different orders or process step dependent references can be stored in the reference tables of the ODM.

As an example, the logistical order or fulfilment order of fulfilment coordination makes use of this functionality. The fulfilment order may exist only out of one header and has several references to schedule lines of other orders (of various types). If the fulfilment order or the schedule line is deleted the relation may also be deleted and may not be restored.

References between schedule lines, to store the relation between confirmation and request may be stored in the schedule line itself. This reference information at schedule line level may be used to identify the hierarchy between items of the same order, too. This may be similar to the mechanism used in R/3 or Advanced Planner and Optimizer (APO—a software product delivered by SAP) to represent the result of rules based Available-To-Promise (ATP—a software component delivered by SAP). In R/3 these items are named main item and sub item.

References between items of one or several order, independent from the confirmation, can be stored in the reference table as well.

In the following, an exemplary data model of the ODM is described. In the Figures, only the key fields and other important fields are shown. Mainly the relations between the different tables and the cardinality should be shown. Key fields are marked in the Figures with an asterisk (*). Tables that may not be part of the described area, but are necessary to understand the context, are displayed in grey.

Figure 7:
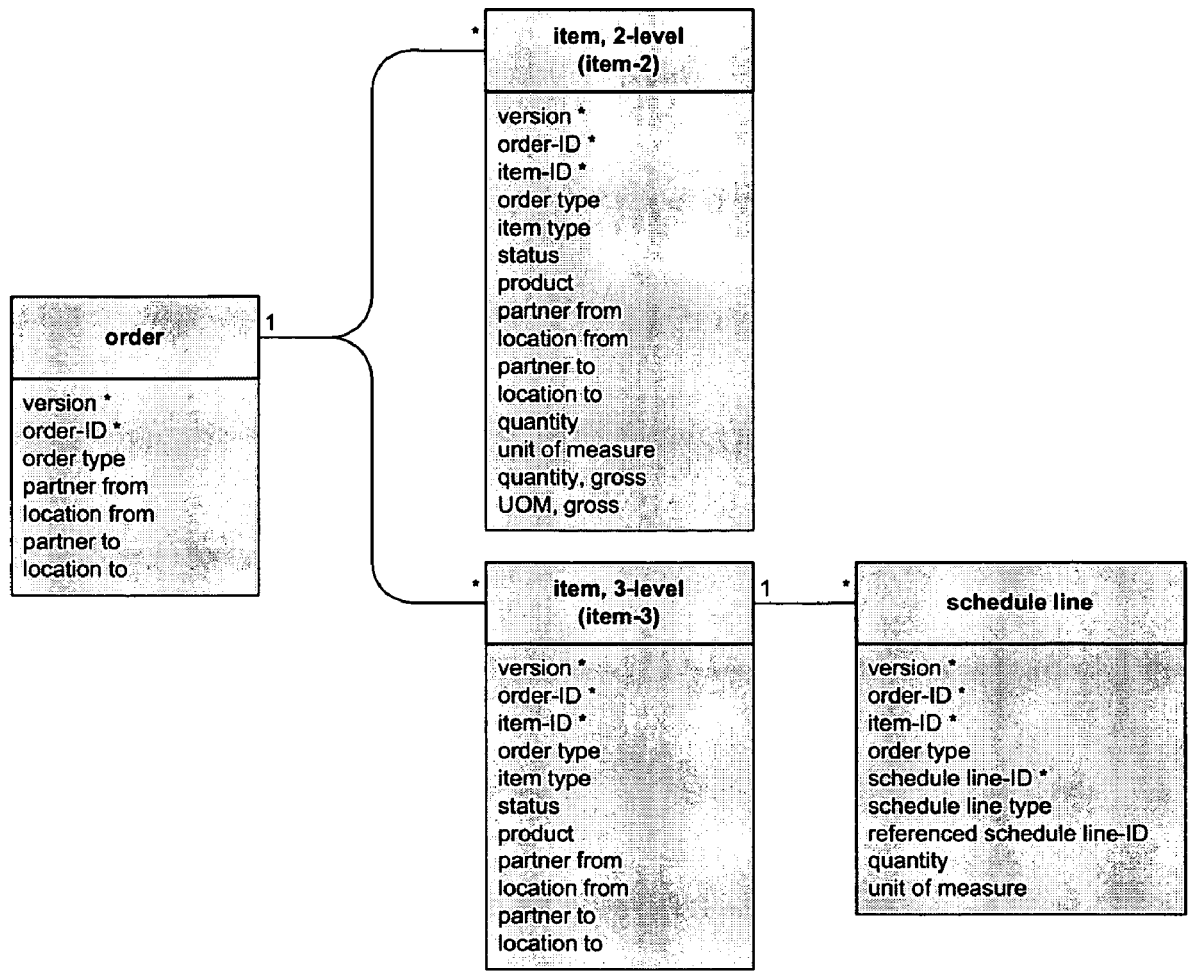
FIG. 7 illustrates an exemplary data structure of order core components.

The order may be stored in the ODM in two types of tables, as illustrated in FIG. 7. The core tables, whose structure may be common for most order types, may be header and—depending on level-type—either of two different items and optionally a schedule line. These tables may represent core components. All other tables—specific to order type or application—are termed extensions. ODM may also allow order data types with non-standard core components, but these are the exceptions among the order data types used for supply chain applications.

The ODM can handle order types with one, two or three levels. All orders of one order data type may be stored in the same manner. As an example, if it is set up that the sales order is a three-level order, the table item-2 is not used, but only the tables item-3 and schedule line are used. One skilled in the art will appreciate that the actual table instances may depend on the order data area as explained above.

Both level-types may use the same structure of the header table. Header and item tables may contain time stamp and user of the last change. All parts of an order must have the same version. For example it is not allowed to combine the header with version A with an item with version B. Order IDs usually may be the same across versions.

There may exist a central value table to define the possible values of the item type. The entries may correspond to the item types used in R/3 and Customer Relationship (CRM—a software component delivered by SAP). This value list can be expanded. The entries can be used by an application for any order type: it is the task of the applications to avoid conflicts; the ODM may not perform any checks when creating or changing an order.

The 2-level order can have only one quantity. This quantity can have several representations (like gross quantity).

An example of an order type with this level-type is the delivery. It may have only one quantity, which should be delivered.

The order ID may not be necessary on schedule line level, because it is redundant, doubling the information of the order ID in the item-3 table. It may be added to the schedule line table to facilitate the reading of schedule lines of one order. Of course, it may have to be filled with the same order ID as the corresponding item of the schedule line.

There may exist a central value table that defines the possible values of the schedule line type. This value list can be expanded. The entries can be used by any order type and application. It is the task of the applications to avoid conflicts.

Figure 8:
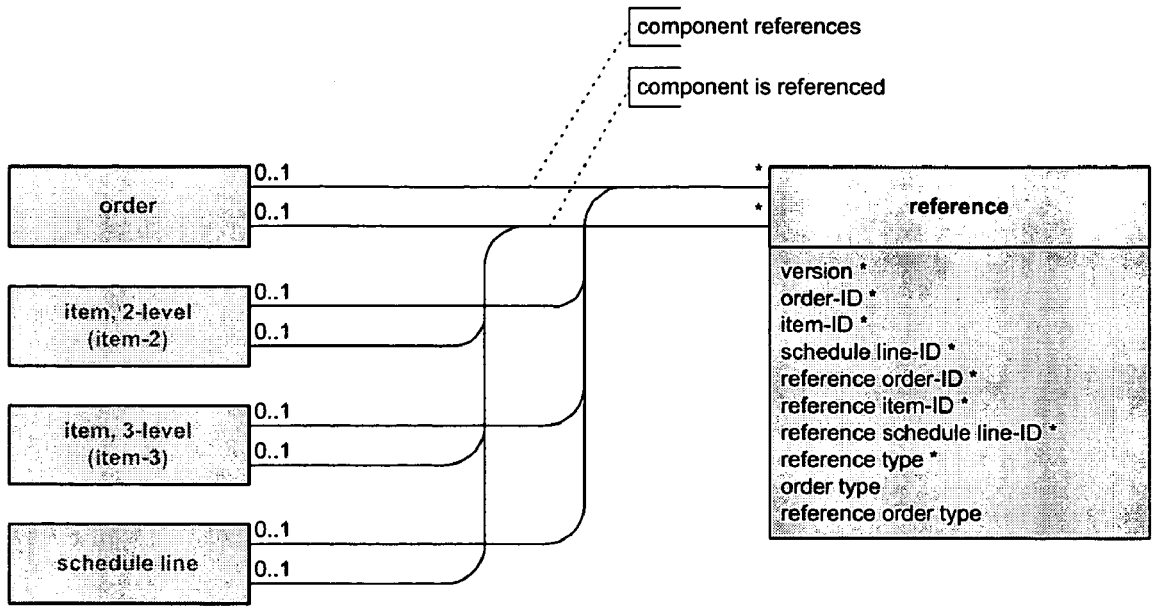
FIG. 8 illustrates an exemplary data structure of a reference table.

The reference table can be used to store links between components (header, item, schedule line) of the same or different orders and order types, as illustrated in FIG. 8.

This is for example used by the fulfilment order that groups several schedule lines of sales orders (or similar orders) together to coordinate their delivery process.

There can be any number of references from one component to any other components (references may, for example, build n:m relationships between components). Each pair of components can be linked in multiple ways that are distinguished by the reference type. The reference may have a reference type to describe the meaning or reason of the connection. A reference can connect components of any level with any other level. References may not be restricted to connect components of the same order. References may be stored in the way they are specified by the applications. In particular, references may be stored with the orders that the application associates them with only. There may be no logic within the ODM to double a reference for storage at referenced and referencing order. Usually, each relationship between components may be stored only once by a single reference in ODM, unless the application decides to create two references.

The read method of ODM may read all order data including the referenced component IDs; with a special, additional method it is possible to get all referencing orders. The component level (header, item, schedule line) to which a reference may be assigned to may be identified by the lowest filled ID value. For example, if an item-ID is filled, but not the corresponding schedule line ID, this represents a reference from or to an item. The combinations of component IDs in reference tables may need to be consistent with the relationships of the components within the referencing and referenced orders.

Mapping may denote the functionality to translate external (readable) numbers or ID's to the internally used IDs. The ODM may use GUIDs to identify the components of orders. Mapping may have the structure as illustrated in Fig. Mapping.

Mapping entries may be stored for the lowest level IDs of an order (i.e., header and item ID combinations for two-level orders and header, item and schedule line IDs for three-level orders), but these entries can also be used for a mapping on higher levels (i.e., on header level for two-level orders and on item level for three-level orders).

The size of the fields order number, item number and schedule line number can be different for different order data types, depending on the size of the number field for the specific orders, while the names of the fields are fixed to unify their access in the code. In the APIs of ODM fields of type string may be used. Every order can have several external numbers, but may have only one per "system": Here partner ID and/or logical system may define a "system".

The mapping table may be filled according to the data provided by applications. For IDs of systems of the own company the partner ID can be empty, but the logical system field must be filled. For IDs of partners, the partner field must be filled, but logical system field can be empty. If the partner has several systems (which use different IDs for the same order), it becomes necessary to fill the logical system field, too. One skilled in the art will appreciate that the mapping table is exemplary and the fields may be filled in any suitable fashion.

The original system of the order may be marked when the order is first created within ODM or as specified by an application. This flag can be used to determine the origin of an order.

Figure 10:
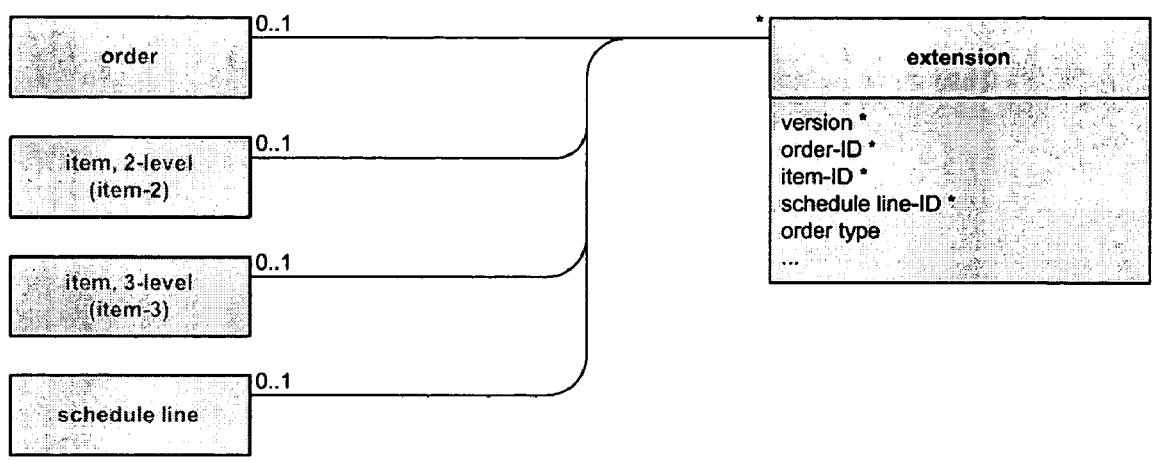
FIG. 10 illustrates an exemplary data structure of an extension.

An extension may be a grouping of several attributes (fields) relevant for a theme into one component, see FIG. 10. The definition of the theme should be relatively loose to reduce the number of extensions and hence the number of tables needed to store an order (in order to improve the performance). Any extension may have the general structure as illustrated in FIG. 10.

An extension can be assigned to any and each of the core components (header, item, schedule line), while each entry in an extension table is assigned to exactly one core component entity (header, item, schedule line). An extension may contain all ID fields for header, item and schedule line (if applicable) to improve the possibilities to select the extension data.

Looking at the entries in an extension, the core component (header, item, schedule line) that it is assigned to can be identified by the "lowest" filled ID field. For example, if the item-ID is filled, but not the schedule line ID, the extension entry may have a reference to the corresponding item. For a 1:n relationship between core component and extension, the extension may need one or several additional key fields to separate the corresponding entries. These additional key fields may not be created automatically by the ODM as the GUIDS for order header, item and schedule line. This means that the application may have to deliver the necessary key values.

Extension tables may be generated for each order data area and extension component upon, for example, activation of the order data area.

Figure 9:
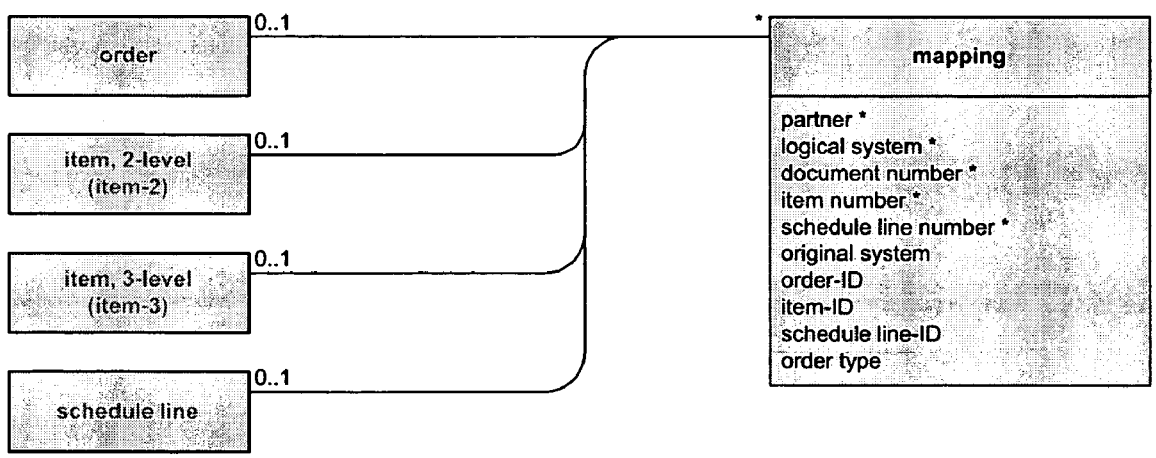
FIG. 9 illustrates an exemplary data structure of mapping.

The core components of order header and order item can store only two partners each. Any additional partners may be stored in the extension, as illustrated in FIG. 9.

Figure 11:
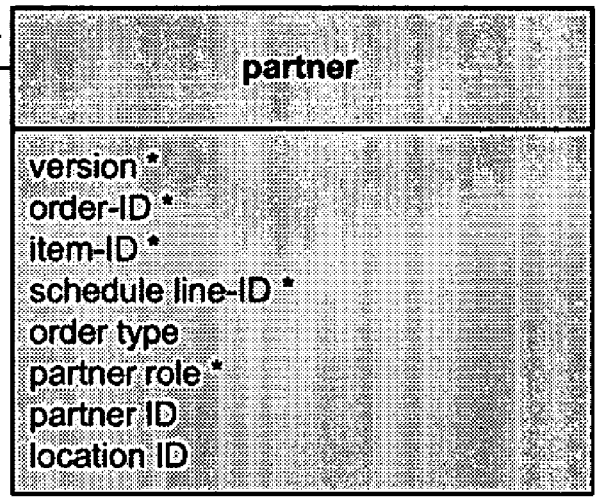
FIG. 11 illustrates an exemplary data structure of a partner extension.

For each core component several additional partner entries can exist. An exemplary structure of a partner entry is given in FIG. 11. The different possible partners may be identified by the partner role. For each partner role only one partner may exist.

The various possible partner roles may be defined in the ODM in a customizing table. These values may be defined according to the partner roles in R/3, CRM, ICH (Inventory Collaboration Hub—a software product delivered by SAP) and APO. However, the ODM may not check against this value list and applications can freely use the partner role field.

Figure 12:
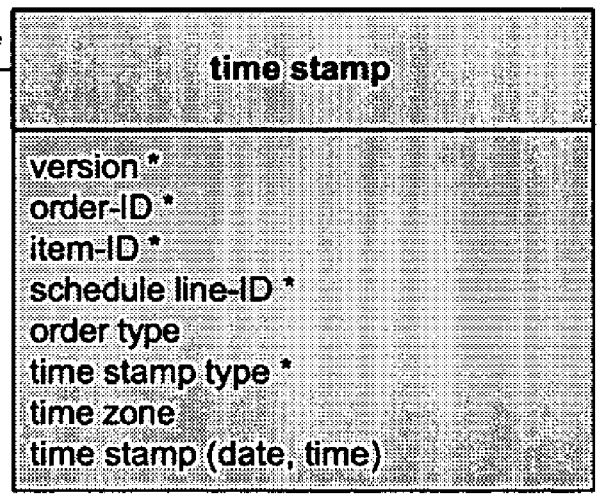
FIG. 12 illustrates an exemplary data structure of a time stamp.

The core components of order header, order item, and order schedule line may store only two time stamps each. Any additional time stamps may be stored in the extension as illustrated in FIG. 12.

For each core component several additional time stamps may exist. Their time stamp type identifies the different possible time stamps. For each time stamp type only one time stamp may exist.

Possible time stamp types may be defined e.g., in the scheduling function of the SCM-Basis.

Figure 13:
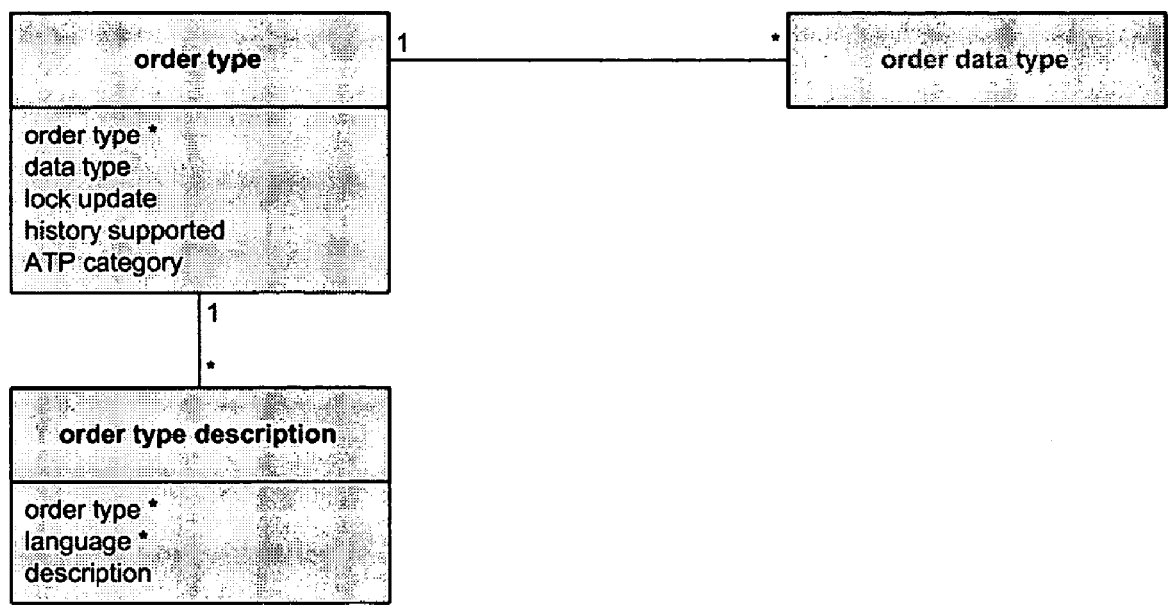
FIG. 13 illustrates an exemplary order type definition.
Figure 14:
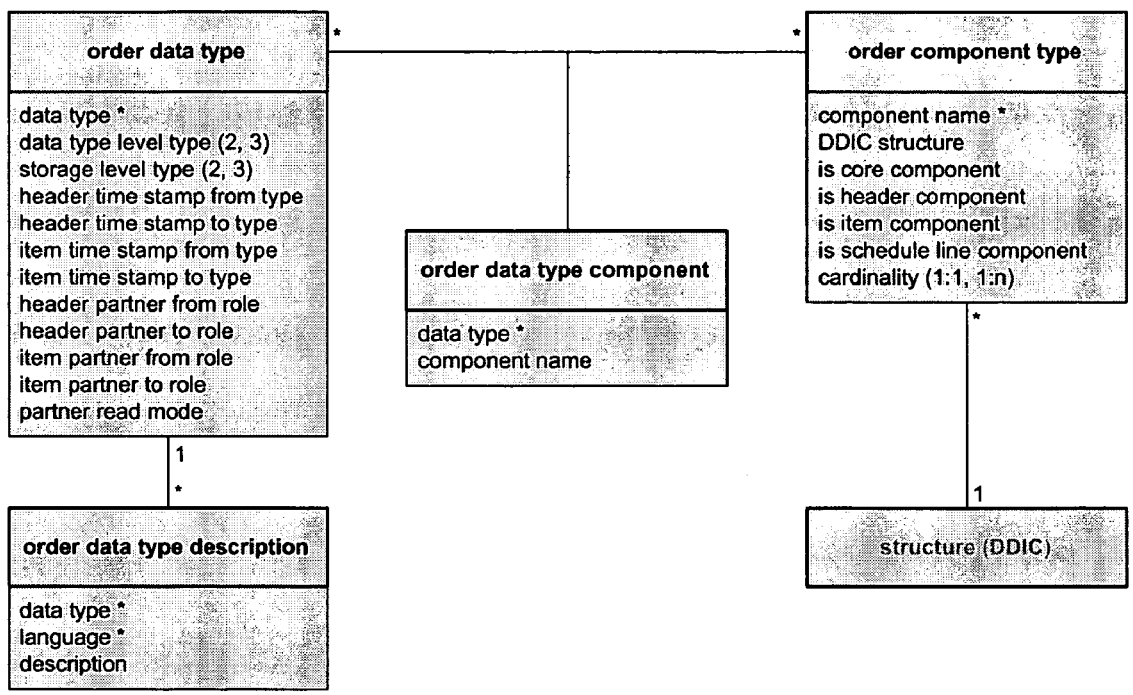
FIG. 14 illustrates an exemplary order data type definition.
Figure 15:
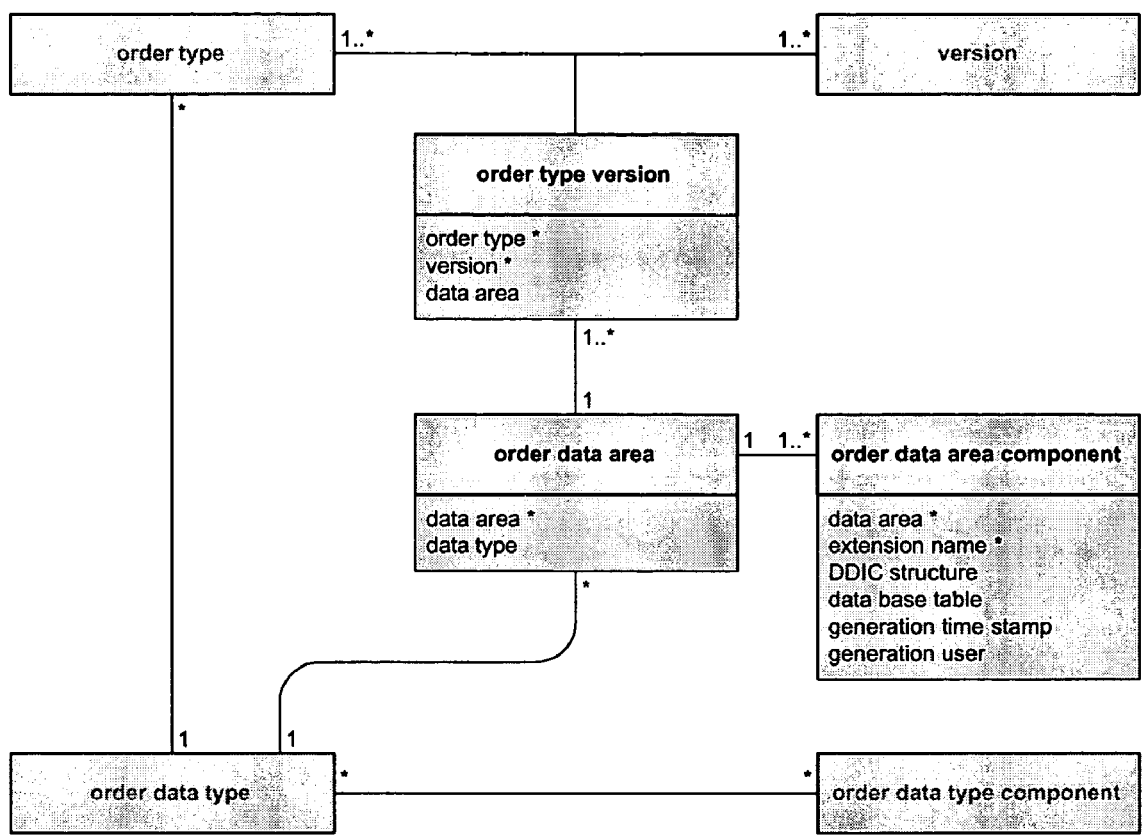
FIG. 15 illustrates an exemplary order data area definition.

The tables according to FIG. 13 to 15 are used to describe how the data of an order type may be stored in the data base.

This meta data information can be used to implement e.g., macro functions or other general functions and UI applications. It may also be used to generate new tables for new order types and the corresponding code for data access; new order types can be created out of existing core components and extensions.

Order types may be defined by the tables, as illustrated in FIG. 13. Every order type may have a readable, language dependent description, which can be used in user interfaces. Every order type may have an order data type and may have only one order data type. The order data type may describe the structure of the order data. With the field lock update one can decide whether orders of the given order type are not locked against other transactions when creating or changing them. If locking is switched off (out of performance reasons), a conflict between two parallel transactions creating or changing the same order can occur. For creation the order would exist twice, while for change the transaction finishing last may override the previous changes that will be lost.

In the following, an exemplary structure of the order and how the information of the order is stored, is given. An order type may specify a single order data type, while several order types can use a given order data type. the order data type may describe the structure of the data of an order, as illustrated in FIG. 14.

Every order document type and order data type may have a readable, language dependent description, which can be used in user interfaces.

The field data type level-type may define the number of levels of the corresponding orders. There may be one-level, two-level and three-level orders. The storage level-type may define, on how many levels the order is stored in the database.

On default, the storage level-type may have the same value as the data type level-type. The storage level-type could only be smaller than or equal to the data type level-type. A three-level order (data type level-type could be stored in a three-level or two-level data model (storage level-type).

If a three-level order were stored with a special two-level data model, the information of the item and the schedule line may be combined in one table: for each schedule line the information represented by the fields of the item would be repeated. If the relationship between item and schedule line entries is, for example, near to 1:1, this could improve performance by using one table less.

In one embodiment of ODM, the storage level may have always the same value as the data level. In particular, it is not supported, that a three-level order can be stored in special two-level tables.

Depending on the storage level-type the item (and the schedule line) may be stored in tables of two different structures (item-2 or item-3). The schedule line component may be used for three-level orders only.

The time stamp types may define which time stamps are directly stored in the core components. If these time stamp types are used to select orders, the performance of the selection may be better than for time stamp types stored in the extension. Only two time stamps may be supported in the core components for this direct access. All other time stamps may be stored in the extension.

The partner roles may define which partner/location data are directly stored in the core components. If these partner roles are used to select orders, the performance of the selection may be better than for partner roles stored in the extension. Only two partner roles may be supported for this direct access. All other partner roles may be stored in the extension Partner.

The partner read mode may define if the partner and location data of the header component is used exclusively or if it could be overwritten by partner and location data that is specified at the item level of an order. If the partner and location fields of the header are exclusively used, the partner roles specified for the item are irrelevant.

The table order data type component may contain all extensions, which are supported by the order data type including the header, item and schedule line components.

All components, which are supported by the ODM, may be collected in the table order component.

For each component one can define with three flags the levels of an order it is associated with. Core components can be assigned to only one level; extensions can be assigned to one, two or three core levels.

With the field cardinality it may be possible to define the relationship between extension entries and core component entries. As described above, any particular extension entry can be assigned to only one core component entry, but more than one entry of an extension could be assigned to a single core component entry if the extension has a 1:n relationship.

In the following, exemplary tables are described in which the order data are stored. This information may be used in the order access methods, to find an order's tables depending on the order type and version.

With the tables illustrated in FIG. 15, the order data area may define, in which set of tables the data of an order may be stored.

All order types that use the same order data type can be stored in the same order data area. But the data may also be partitioned to be stored in different sets of tables according to order type and/or version. For example, it is possible to store the active version exclusive in one set and all other versions together in another set of tables. Or each version could be stored in its own set of tables.

The tables to store order data may be generated, if the corresponding order data area is activated. An order data area may be specific to an order data type; it can be assigned to specific order type(s) and version(s). The tables may be generated according to the structures assigned to the components and extensions of the order data type. If an order data area is activated and the corresponding tables are generated, these structures may also copied to the generation namespace. These copied structures may be used in the interfaces of the methods of the ODM. Because of this, the ODM may be independent from changes in the template structures, which are used in the order data type. The structures can be changed without disturbing the ODM.

The activation report for order data areas can compare the definition of the order type with previously existing tables by comparing the order data type structures and the copied working structures. If possible, missing parts may be added to the tables in the generation process to conserve the content of the existing tables.

An extension may not be removed from an order data type, if any of the database tables of this extension are not empty.

Only active order data areas may be used for data access, because otherwise the correspondence of order component structures and generated tables cannot be guaranteed.

In another embodiment, the de-activation may be forced by changes to the order components. (Re-)activation of an order data area may (re-)generate the tables according to the (new) definition of the order components. With this process, data might be lost and corresponding warnings need to be given to the user when changing the order component and re-activating the order data areas.

In this context, the activation code may compare the time stamps of last activation for a table of an order data area with the ones for the corresponding order component's structure to find out whether the table needs to be re-generated. Furthermore, the activation code may also evaluate whether fields have been added to the structure or removed (by comparing it with the copied structure). In the latter case, the re-activation might cause a loss of data.

All methods of the ODM that process orders may be able to handle one or several orders. Each method call may handle orders of a single version only; it is not possible to mix order data of several versions in one call.

GET-methods may be used to read order data from the ODM. Several methods of this type are supported. The orders can be selected specifying IDs, references or selection criteria.

In each case the order type may have to be specified. For the selection of the orders by selection criteria one can define access paths that allow selection on any combination of fields in the order's core and extension components. For simple standard selections involving the core components only, no access paths may need to be defined.

It may be specified which parts (core components and extensions) of the order should be read with a GET method call. All other parts may not be read to increase performance.

It may be specified, that all orders that have been read be locked automatically for a following change of the orders. If not all orders could be locked, a list of the not locked orders may be provided. This may not influence the result of the method call.

The SET-method may be used to create or change order data in the ODM. It can also be used to delete individual items of an order. If a header entry is being deleted it may call an appropriate DELETE method. The SET-method (in case of creating the order) can be called with several external, readable numbers per one order. One of these external representations may have to be marked as the one from the original system. It may not be necessary that the order is read or locked before it is changed.

It may be specified that orders are not be locked when they are created or changed. The locking may be switched of in the SET method or at order type. If at one of both places the locking is switched off, the order may not be locked.

Normally the order may be locked with the internal GUID. If the order is created, additionally the external number of the original system may be used for locking. This locking with the readable numbers may be done on header level only, which is sufficient, because it may only be used if the order is created.

The locking with GUIDs may be done on item level. This latter type of locking may be used in case the order is created and the GUID is provided from the calling application and in case an order or one item of an order is changed. Schedule lines may be considered as a unit together with the corresponding items, so that they are locked together with the item.

If an order is not locked, it could happen that another, parallel transaction can change the same order in another manner. The transaction that finishes last (COMMIT WORK) may finalize its changes. All other parallel changes may be lost.

It may be possible to change only parts of the order. Only those components that are transferred to the method may be changed on the database. Each transferred part may have to be completely specified; components that are not specified may remain unchanged.

The internal keys of the components (header, item, schedule line) may be predefined by the application (flag in API). In this case they may have to be delivered to the SET-method at the creation of a new order. They may need to be globally unique keys. This application may connect parts of the orders with own data without the need to create an own mapping between different internal keys.

DELETE-methods may be used to delete the order data from the ODM. Two methods of this type may be supported: orders can be deleted by ID or by selection criteria.

In each case the order type may have to be specified. Usually, the version may have to be specified, too. With an additional parameter it can be defined, that the order should be deleted in all versions.

For the selection of the orders by selection criteria only attributes of the core components, partner extensions and time extensions may be used for selection: orders may be selected by partner, location, product and time stamp. There is no restriction on the combination of these attributes. Any role of partner and any type of time stamp may be used in the selection.

Also, parts of the orders can be deleted. It is possible to delete only one item of the order. All dependent parts (extensions and schedule lines) may be deleted automatically. Also the references of this item and their schedule lines may be deleted.

Referencing entries (in other orders than the deleted one) may not be deleted automatically, but may need to be identified with a special method first. This may not be done out of performance reasons in order not to have to search all order data areas for references to an order that is to be deleted It may be specified that all selected orders be locked automatically for a following deletion of the orders. If not all orders could be locked, a list of the not locked orders will be provided. Only the locked orders may be deleted.

The ODM may provide a buffer of configuration data, which may contain the definitions of order types, order data types and order data areas. To buffer this data independent from the transaction, the data may be buffered using shared objects If the buffer content is invalid (the time stamp is expired), the configuration data may be reread from database into the buffer.

The methods of the ODM may be called by various applications to create, read, change and delete the orders. Orders may be received or send via XML messages from other systems. The necessary inbound and outbound processing functionality may be part of the Business Object Layer (BOL) and B2B Interface Layer.

The present techniques can be implemented in digital electronic circuitry, or in computer hardware, firmware, software, or in combinations of them. Apparatus of the invention can be implemented in a computer program product tangibly embodied in a machine-readable storage device for execution by a programmable processor. Method steps according to the invention can be performed by a programmable processor executing a program of instructions to perform functions of the invention by operating on the basis of input data, and by generating output data. The invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor may receive instructions and data from memories, in particular from read-only memories and/or random access memories. A computer may include one or more mass storage devices for storing data; such devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by or incorporated in ASICs (application-specific integrated circuits).

By way of a non-limiting example, to provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical or text user interface through which computer programs interact with users.

A computer may include a processor, memory coupled to the processor, a hard drive controller, a video controller and an input/output controller coupled to the processor by a processor bus. The hard drive controller may be coupled to a hard disk drive suitable for storing executable computer programs, including programs embodying the present technique. The I/O controller may be coupled by means of an I/O bus to an I/O interface. The I/O interface may receive and transmit in analog or digital form over at least one communication link. Such a communication link may be a serial link, a parallel link, local area network, or wireless link (e.g., an RF communication link). A display may be coupled to an interface, which is coupled to an I/O bus. A keyboard and pointing device may also be coupled to the I/O bus. Alternatively, separate buses may be used for the keyboard pointing device and I/O interface.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method of managing data for an order for products or services, the method comprising the steps performed by a computer of:
    assigning an order data type to the order, wherein the order data type defines a structure for tables of a database;
    storing, in the database, data for the order, wherein the data for the order is stored as a hierarchical object comprising a plurality of core component tables and one or more extension tables having pluralities of entries;
    assigning at least one of the one or more extension tables to at least two of the core component tables, wherein each entry in the assigned extension table is assigned to one of the at least two of the core component tables; and
    outputting, to a display device, the data for the order.

2. The method of claim 1, wherein the plurality of core component tables comprise an order header component table, an order item component table, and an order schedule line component table.

3. The method of claim 1, wherein the one or more extension tables include a standard key that identifies the order.

4. The method of claim 1, further comprising:
    storing, in the database, a reference that links two of the plurality of core component tables.

5. The method of claim 1, further comprising:
    storing additional orders of the same data order type in the tables of the database.

6. The method of claim 2, wherein the order header component table comprises business partner information.

7. The method of claim 2, wherein the order item component table comprises product information and delivery location.

8. The method of claim 2, wherein the order schedule line component table comprises a quantity and a time stamp.

9. The method of claim 2, wherein the one or more extension tables comprise additional information relating to a corresponding assigned one of the plurality of core component tables.

10. A system for managing data for an order for products or services, the system comprising:
    a memory storing program instructions; and
    a processor for executing the program instructions to:
        assign an order data type to the order, wherein the order data type defines a structure for tables of a database;
        store, in the database, data for the order, wherein the data for the order is stored as a hierarchical object comprising a plurality of core component tables and one or more extension tables having pluralities of entries;
        assign at least one of the one or more extension tables to at least two of the core component tables, wherein each entry in the assigned extension table is assigned to one of the at least two of the core component tables; and
        output, to a display device, the data for the order.

11. The system of claim 10, wherein the plurality of core component tables comprise an order header component table, an order item component table, and an order schedule line component table.

12. The system of claim 10, wherein the one or more extension tables include a standard key that identifies the order.

13. The system of claim 10, further comprising:
    means for storing, in the database, a reference that links two of the plurality of core component tables.

14. A computer-readable storage medium storing program instructions for performing a method of managing data for an order for products or services, the method comprising:
    assigning an order data type to the order, wherein the order data type defines a structure for tables of a database;
    storing, in the database, data for the order, wherein the data for the order is stored as a hierarchical object comprising a plurality of core component tables and one or more extension tables having pluralities of entries;
    assigning at least one of the one or more extension tables to at least two of the core component tables, wherein each entry in the assigned extension table is assigned to one of the at least two of the core component tables; and
    outputting, to a display device, the data for the order.

15. The computer-readable storage medium of claim 14, wherein the plurality of core component tables comprise an order header component table, an order item component table, and an order schedule line component table.

16. The computer-readable storage medium of claim 14, wherein the one or more extension tables include a standard key that identifies the order.

17. The computer-readable storage medium of claim 14, further comprising:
    storing, in the database, a reference that links two of the plurality of core component tables.

* * * * *